Nov. 8, 1932.　　　　F. GUTERMUTH　　　　1,886,951

PHOTOGRAPHIC BELLOWS CAMERA FOR ROLL FILMS

Filed Feb. 28, 1929

Patented Nov. 8, 1932

1,886,951

UNITED STATES PATENT OFFICE

FRIEDRICH GUTERMUTH, OF FRANKFORT-ON-THE-MAIN, GERMANY, ASSIGNOR TO THE FIRM CARL NEITHOLD A.-G., OF FRANKFORT-ON-THE-MAIN, GERMANY

PHOTOGRAPHIC BELLOWS CAMERA FOR ROLL FILMS

Application filed February 28, 1929, Serial No. 343,477, and in Germany March 15, 1928.

This invention relates to photographic bellows-cameras and is intended for reducing the constructional height and width, as also the length of such cameras.

According to the invention the end of the bellows directed away from the lens is fastened instead of onto a frame lying perpendicular to the centre line of the bellows, onto a frame, the cheeks of which extend substantially parallel to the centre line of the bellows.

The advantage of this construction consists in that the end of the bellows directed away from the lens is bent over towards the outside in tubular shape above and around the bellows and fastened on the inner surface of the frame so that the undulations of the bellows enter the end of the bellows.

An embodiment of the invention is illustrated by way of example in the accompanying drawing in which.

Figure 1:
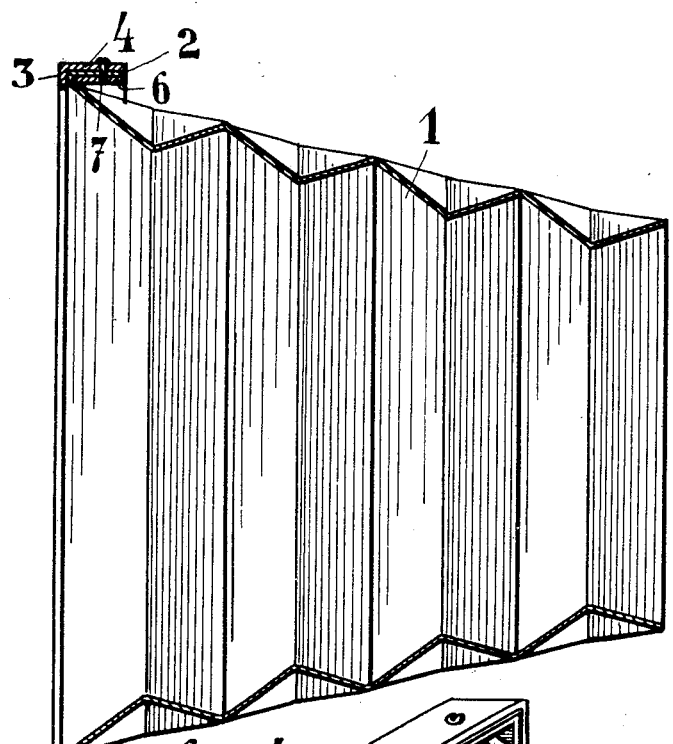
Fig. 1 shows in longitudinal section the fastening of the bellows to this frame.
Figure 2:
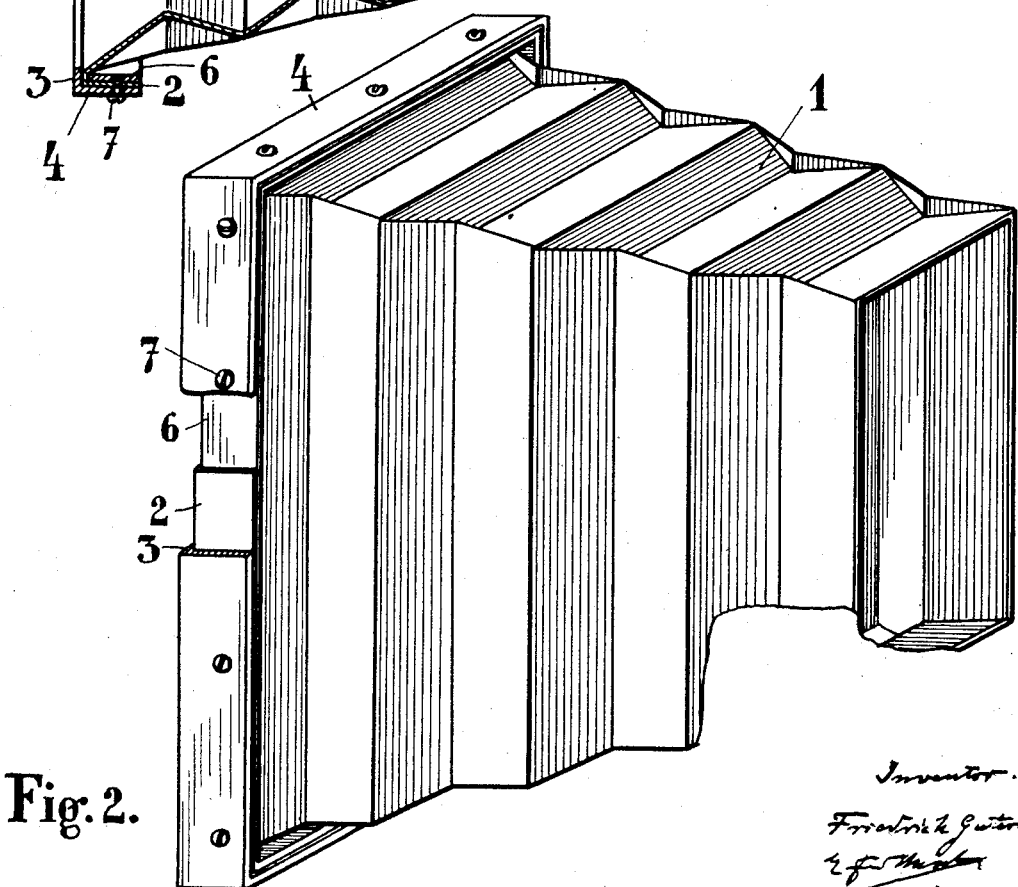
Fig. 2 shows the arrangement in perspective, partly in section.

In the drawing 1 represents the bellows of the camera the end 2 of which, distant from the lens, is bent over in tubular shape above and around the bellows 1. The frame 3 has cheeks 4 extending substantially parallel to the longitudinal axis of the bellows, which enables both the constructional height as also the width of the camera to be considerably reduced.

The fastening of the outwardly bent over bellows end 2 onto cheeks 4 of the frame 3 is effected in that the bellows end 2 is pressed against the inner surface of the cheeks 4 by means of a counter bar 6 and clamped with screws 7 passing therethrough. The undulations of the bellows can in this manner fold into the end of the bellows so that the constructional length of the camera is also reduced.

I claim:—

1. In a photographic bellows camera the combination of a frame having cheeks extending substantially parallel to the axis of the bellows, and of a portion of the bellows at the opposite end to the lens folded back over the rear end of the bellows parallel to the axis of the bellows fastened on the inner surface of said cheeks.

2. In a photographic bellows camera the combination of a frame having cheeks extending substantially parallel to the axis of the bellows, and the last fold of the bellows folded back on all sides over the rear end of the bellows and extending towards the lens parallel to the axis of the bellows fastened on the inner side of said frame adapted to accommodate the undulations of the bellows when collapsed.

In testimony whereof I affix my signature.

FRIEDRICH GUTERMUTH.